United States Patent
Kobayashi

(10) Patent No.: US 7,738,910 B2
(45) Date of Patent: Jun. 15, 2010

(54) TRANSMISSION POWER CONTROL METHOD AND APPARATUS

(75) Inventor: Yutaka Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 558 days.

(21) Appl. No.: 10/796,232

(22) Filed: Mar. 9, 2004

(65) Prior Publication Data

US 2004/0248608 A1 Dec. 9, 2004

(30) Foreign Application Priority Data

Jun. 9, 2003 (JP) ............................. 2003-163633

(51) Int. Cl.
*H04B 7/00* (2006.01)
(52) U.S. Cl. .......................... 455/525; 455/68; 455/69; 455/522
(58) Field of Classification Search ................... 455/68, 455/69, 517, 522
See application file for complete search history.

(56) References Cited

U.S. PATENT DOCUMENTS

| | | | |
|---|---|---|---|
| 6,490,461 B1 * | 12/2002 | Muller | 455/522 |
| 6,697,634 B1 * | 2/2004 | Hayashi | 455/522 |
| 7,079,550 B2 * | 7/2006 | Padovani et al. | 370/468 |
| 2002/0021682 A1 * | 2/2002 | Ariyoshi et al. | 370/335 |
| 2003/0003942 A1 * | 1/2003 | Okumura | 455/522 |
| 2003/0012267 A1 * | 1/2003 | Jitsukawa et al. | 375/148 |
| 2003/0119452 A1 * | 6/2003 | Kim et al. | 455/69 |

FOREIGN PATENT DOCUMENTS

| | | |
|---|---|---|
| EP | 0 853 393 | 7/1998 |
| JP | 2004-274117 | 9/2004 |
| WO | WO97/50197 | 12/1997 |
| WO | WO 00/48336 | 8/2000 |
| WO | WO 01/11800 | 2/2001 |

OTHER PUBLICATIONS

Notification of Reasons for Refusal dated Dec. 4, 2007, from the corresponding Japanese Application.

* cited by examiner

*Primary Examiner*—Nay A Maung
*Assistant Examiner*—Tuan H Nguyen
(74) *Attorney, Agent, or Firm*—Katten Muchin Rosenman LLP

(57) ABSTRACT

Disclosed is a transmission power control method for comparing the error rate of receive data and a target error rate in an apparatus on the receiving side, controlling target SIR (performing outer-loop control) and controlling transmission power on the transmitting side in such a manner that measured SIR will agree with the target SIR. In outer-loop control, it is determined whether an interval is an interval in which data is being transmitted and (1) in an interval in which data is being transmitted, the target SIR is controlled upon comparing the error rate of receive data after decoding and the target error rate, and (2) in an interval in which data is not being transmitted, the target SIR is controlled upon measuring error rate of a demodulated pilot or of a synchronous word and comparing the measured error rate of the pilot and a target error rate of the pilot.

22 Claims, 13 Drawing Sheets

SW BITS IN PILOT BITS (EXAMPLE) (SHADED PORTIONS INDICATE SW-BITS)

TFCI (10 bits) $a_9 \cdots a_0$ → (32, 10) sub-code of second order Read-Muller code → TFCI code word $b_0 \cdots b_{31}$

| i | Mi,0 | Mi,1 | Mi,2 | Mi,3 | Mi,4 | Mi,5 | Mi,6 | Mi,7 | Mi,8 | Mi,9 |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

TRANSMISSION POWER CONTROL METHOD AND APPARATUS

BACKGROUND OF THE INVENTION

This invention relates to a method and apparatus for controlling transmission power in CDMA mobile communications. More particularly, the invention relates to a transmission power control method and apparatus for comparing the error rate of receive data and a target error rate on the receiving side, controlling a target SIR and causing the transmitting side to control transmission power in such a manner that measured SIR will agree with the target SIR.

In order to distinguish a channel by a spreading code in W-CDMA mobile communications, multiple channels can share a single frequency band. In an actual mobile communications environment, however, a receive signal is susceptible to interference from its own channel and from other channels owing to delayed waves ascribable to multipath fading and radio waves from other cells, and this interference has an adverse influence upon channel separation. Further, the amount of interference sustained by a receive signal varies with time owing to momentary fluctuations in reception power ascribable to multipath fading and changes in the number of users communicating simultaneously. In an environment in which a receive signal is susceptible to noise that varies with time in this fashion, it is difficult for the quality of a receive signal in a mobile station linked to a base station to be maintained at a desired quality in a stable manner.

Inner-Loop Transmission Power Control

In order to follow up a change in number of interfering users and a momentary fluctuation caused by multipath fading, inner-loop transmission power control is carried out. In such control, the signal-to-interference ratio (SIR) is measured on the receiving side and the measured value is compared with a target SIR, whereby control is exercised in such a manner that the SIR on the receiving side will approach the target SIR.

FIG. 10 is a system block diagram for describing inner-loop transmission power control according to the prior art. Here only one channel of the system is illustrated. FIG. 11 is a flowchart of processing in inner-loop transmission power control according to the prior art.

A spread-spectrum modulator $1a$ of a base station 1 spread-spectrum modulates transmit data using a spreading code conforming to a specified channel. The spread-spectrum modulated signal is subjected to processing such as orthogonal modulation and frequency conversion and the resultant signal is input to a power amplifier $1b$, which amplifies this signal and transmits the amplified signal toward a mobile station 2 from an antenna. A despreading unit $2a$ in the receiver of the mobile station applies despread processing to the receive signal and a demodulator $2b$ demodulates the receive data (step 101). A SIR measurement unit $2c$ measures the power ratio between the receive signal and an interference signal and a comparator $2d$ compares target SIR and measured SIR (step 102). If the measured SIR is greater than the target SIR, a TPC (Transmission Power Control) bit generator $2f$ creates a command that lowers the transmission power by TPC bits (step 103). If the measured SIR is less than the target SIR, on the other hand, the TPC bit generator $2f$ creates a command that raises the transmission power by the TPC bits (step 104). The target SIR is a SIR value necessary to obtain, e.g., $10^{-3}$ (error occurrence at a rate of once every 1000 times). This value is input to the comparator $2d$ from a target-SIR setting unit $2e$. A spread-spectrum modulator $2g$ spread-spectrum modulates the transmit data and TPC bits. After spread-spectrum modulation, the mobile station 2 subjects the signal to processing such as a DA conversion, orthogonal modulation, frequency conversion and power amplification and transmits the resultant signal toward the base station 1 from an antenna. A despreading unit is on the side of the base station applies despread processing to the signal received from the mobile station 2, and a demodulator $1d$ demodulates the receive data and TPC bits and controls the transmission power of the base station 1 in accordance with a command specified by the TPC bits (step 105).

FIG. 12 is a diagram showing an uplink frame structure standardized by the $3^{rd}$ Generation Partnership Project (referred to as "3GPP" below). There is a DPDCH data channel (Dedicated Physical Data Channel) on which only transmit data is transmitted, and a DPCCH control channel (Dedicated Physical Control Channel) on which control data such as a pilot and TPC bit information is multiplexed. After each of these is spread by an orthogonal code, they are mapped onto real and imaginary axes and multiplexed. One frame of the uplink has a duration of 10 ms and is composed of 15 slots (slot #0 to slot #14). The DPDCH data channel is mapped to an orthogonal I channel of QPSK modulation, and the DPCCH control channel is mapped to an orthogonal Q channel of QPSK modulation. Each slot of the DPDCH data channel (I channel) consists of $N_{data}$ bits, and the $N_{data}$ varies in accordance with the symbol rate. Each slot of the DPCCH control channel (Q channel) that transmits the control data consists of ten bits, has a symbol rate of 15 ksps and transmits a pilot PILOT, transmission power control data TPC, a transport format combination indicator TFCI and feedback information FBI.

The TFCI is a parameter which, when the encoded data of each transport channel TrCH is multiplexed and transmitted on the transmitting side, indicates how the encoded data of each transport channel TrCH was multiplexed in such a manner that the data can be demultiplexed correctly on the receiving side. The TFCI of ten bits is subjected to encoding processing, made a 32-bit TFCI code word and transmitted.

Outer-Loop Transmission Power Control

Owing to changes in traveling velocity during communication and changes in the propagation environment ascribable to travel, the SIR that is necessary to obtain a desired quality (the block error rate, or BLER) is not constant. In order to deal with these changes, the block error rate BLER is observed and control is exercised so as to increase the target SIR if the observed value of BLER is inferior to the target BLER and decrease the target SIR if the observed value of BLER is superior to the target BLER. Control that thus changes the target SIR adaptively in order to achieve the desired quality is well known as outer-loop transmission power control (outer-loop TPC).

FIG. 13 is a block diagram illustrating a transmission power control apparatus on the receiving side, the apparatus including an outer-loop control section. Components identical with those shown in FIG. 10 are designated by like reference characters. FIG. 14 is a processing flowchart of outer-loop control. As shown in FIG. 13, the apparatus includes a radio unit 21, a modem unit 22 and a codec unit 23.

A signal that has been transmitted from the base station 1 is received by the radio unit 21 and is demodulated by the demodulator $2b$ of the modem unit 22, after which the demodulated signal is decoded by an error-correction decoder $2h$ of the codec unit 23 (step 201). A receive BLER measurement unit (e.g., a CRC detector) $2j$ performs CRC error detection for every transport block TrBk and inputs the result (measured BLER) of error detection of each transport block TrBk to a target-SIR controller $2k$ (step 202).

Since the system specifies target block error rate (BLER) by transport channel (TrCH), the target-SIR controller $2k$ compares the input measured BLER and the target BLER (step 203), exercises control of the target SIR in such a manner that the target SIR is increased a prescribed amount (step 204) if the measured BLER is greater than the target BLER and decreased a prescribed amount (step 205) if the measured BLER is less than the target BLER. The update period and amount of update of the target SIR change depending upon the target quality specified. By virtue of the control described above, the target SIR is regulated as indicated intervals A, B in FIG. 15.

The outer-loop control set forth above is for a case where the transmitting side is transmitting data on the DPDCH (FIG. 12). However, in a case where data is not being transmitted, the codec unit 23 cannot measure the BLER of the receive data. As a consequence, outer-loop control is not carried out and the target SIR is held constant, as indicated at C in FIG. 15. It is required that the constant value of target SIR be set to a value that will make it possible to maintain synchronism between the transmitting side and the receiving side. This is because the mobile station will stop transmitting unless the synchronism between the transmitting side and the receiving side can be maintained.

Since AMR data and UDI (Unrestricted DIgital) data is continuous data, data always exists on the transport channel (TrCH). However, owing to bursty transmission, there are times when a packet does and does not have TrCH data.

Other Outer-Loop Control Scheme

Besides control for adjusting the target SIR using the block error rate (BLER) after error correction and decoding as described above, there is also a proposed technique (International Laid-Open No. WO97/50197) for estimating BLER from the error rate of the pilot signal and updating the target SIR.

Conventionally, a case (receive data non-existent) where only maintenance of communication synchronism by a pilot signal is being performed by the modem unit 22 (FIG. 13) and a case (receive data exists) where communication of control data and user data by the codec unit 23 is being performed are not distinguished from each other. Consequently, there is no data decoded by the codec unit 23 and, in the interval where synchronism of communication is merely being maintained by the pilot signal, the target SIR cannot be controlled and becomes a constant value (C in FIG. 15). In this interval, however, it is required that enough power for enabling maintenance of synchronism be generated irrespective of the target SIR. As a result, the prior art is such that in an interval in which data is not being transmitted, the difference between the target SIR of a constant value and the smallest SIR necessary to maintain synchronism by the pilot signal becomes excessive power.

Further, with control that updates the target SIR by a pilot signal as disclosed in Patent Reference 1, the target SIR can be updated even when communication is taking place solely on DPCCH, i.e., even when there is no receive data. According to the prior art, however, control is exercised without giving any consideration whatsoever to the SIR value needed to maintain synchronism. As a consequence, the difference between the target SIR and the smallest SIR needed to maintain synchronism by the pilot signal becomes excessive power. Further, according to the prior art, the pilot error rate is measured without executing decoding processing and therefore a problem which arises is that the measured error rate contains an error. This means that control of transmission power cannot be carried out.

SUMMARY OF THE INVENTION

Accordingly, an object of the present invention is to provide a transmission power control method and apparatus for performing accurate control of transmission power and exercising control in such a manner that target SIR will become the smallest SIR needed to maintain synchronism when there is no DPDCH data.

Another object of the present invention is to provide a transmission power control method and apparatus for reducing transmission power, reducing noise and decreasing traffic that is to undergo transmission power control.

According to the present invention, the foregoing objects are attained by providing a transmission power control method for comparing error rate of receive data and a target error rate in an apparatus on the receiving side, controlling target SIR (performing outer-loop control) and controlling transmission power on the transmitting side (performing inner-loop transmission power control) in such a manner that measured SIR will agree with the target SIR. In outer-loop control, it is determined whether an interval is an interval in which data is being transmitted and (1) the target SIR is controlled upon comparing the error rate of receive data after decoding and the target error rate in an interval in which data is being transmitted, and (2) the target SIR is controlled upon measuring error rate of a demodulated pilot or of a synchronous word and comparing the measured error rate of the pilot and a target error rate of the pilot in an interval in which data is not being transmitted.

Adopting the above arrangement makes it possible to exercise transmission power control accurately. Further, when the measured error rate of the pilot and the target error rate of the pilot are compared and the target SIR is lowered, the target error rate is set in such a manner that the transmitting and receiving sides will not become desynchronized. As a result, even when there is no DPDCH data, transmission power control can be performed in such a manner that the target SIR will become the smallest needed to maintain synchronism, transmission power is reduced and it becomes possible to reduce noise and lighten traffic that is to undergo transmission power control.

Other features and advantages of the present invention will be apparent from the following description taken in conjunction with the accompanying drawings.

DESCRIPTION OF THE PREFERRED EMBODIMENTS

(A) First Embodiment

Figure 1:
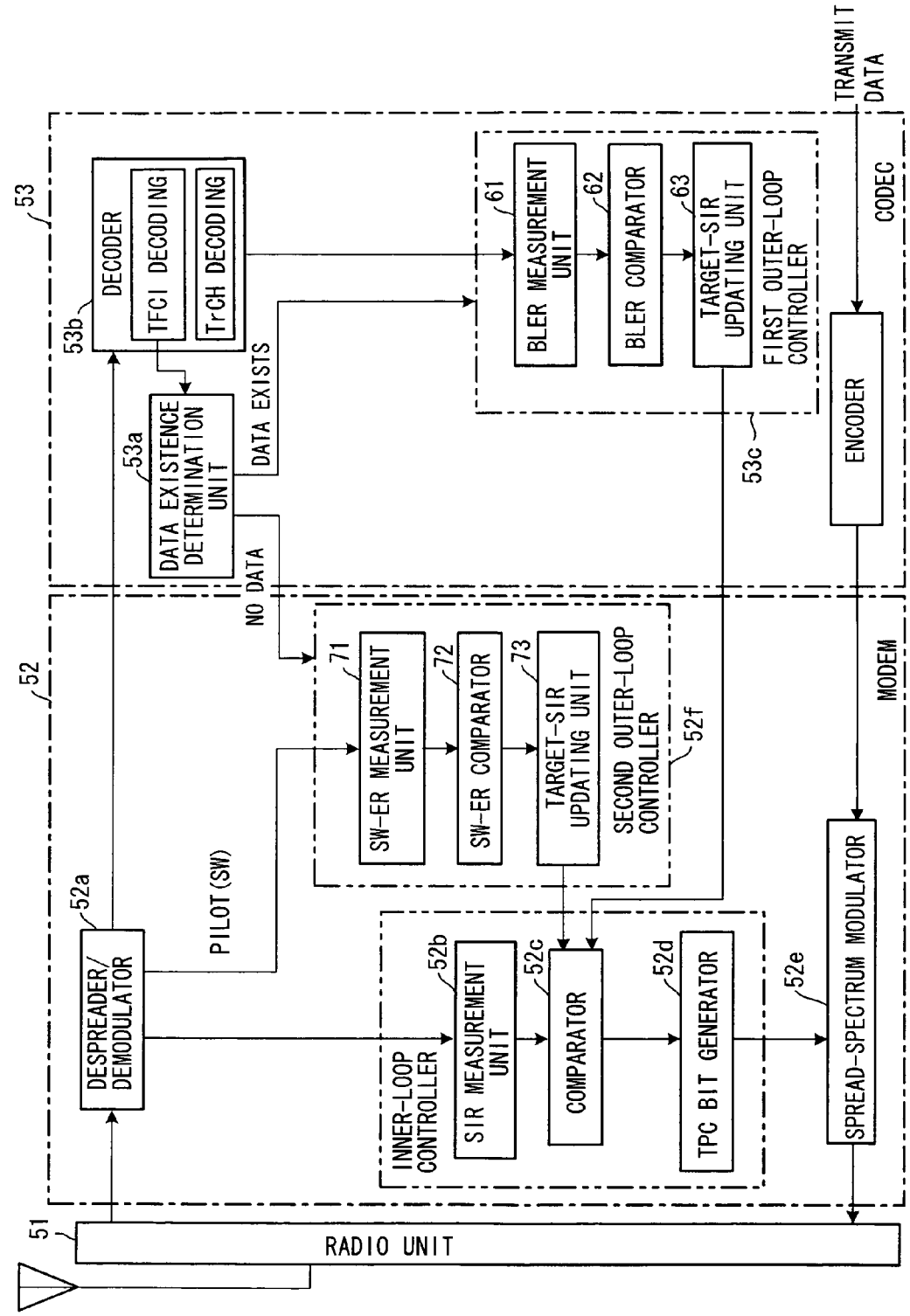
FIG. 1 is a block diagram illustrating a transmission power control apparatus.
Figures 2, 3:
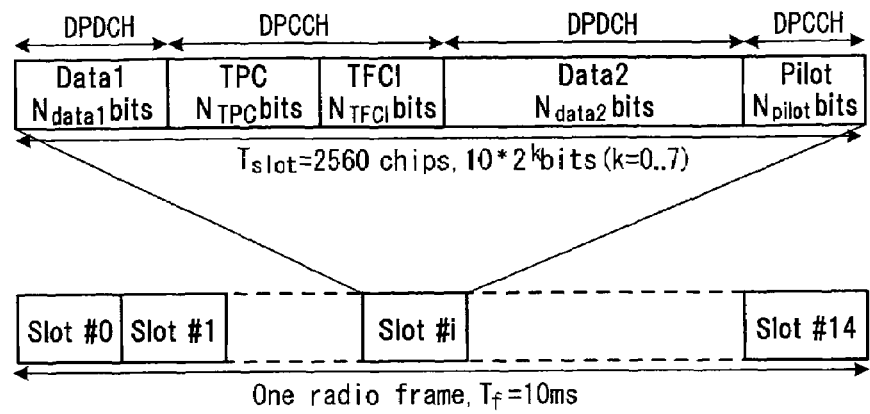
FIG. 2 is a diagram showing the frame structure of a downlink dedicated physical channel DPCH.
FIG. 3 is a diagram useful in describing a synchronous word SW.
Figure 4:
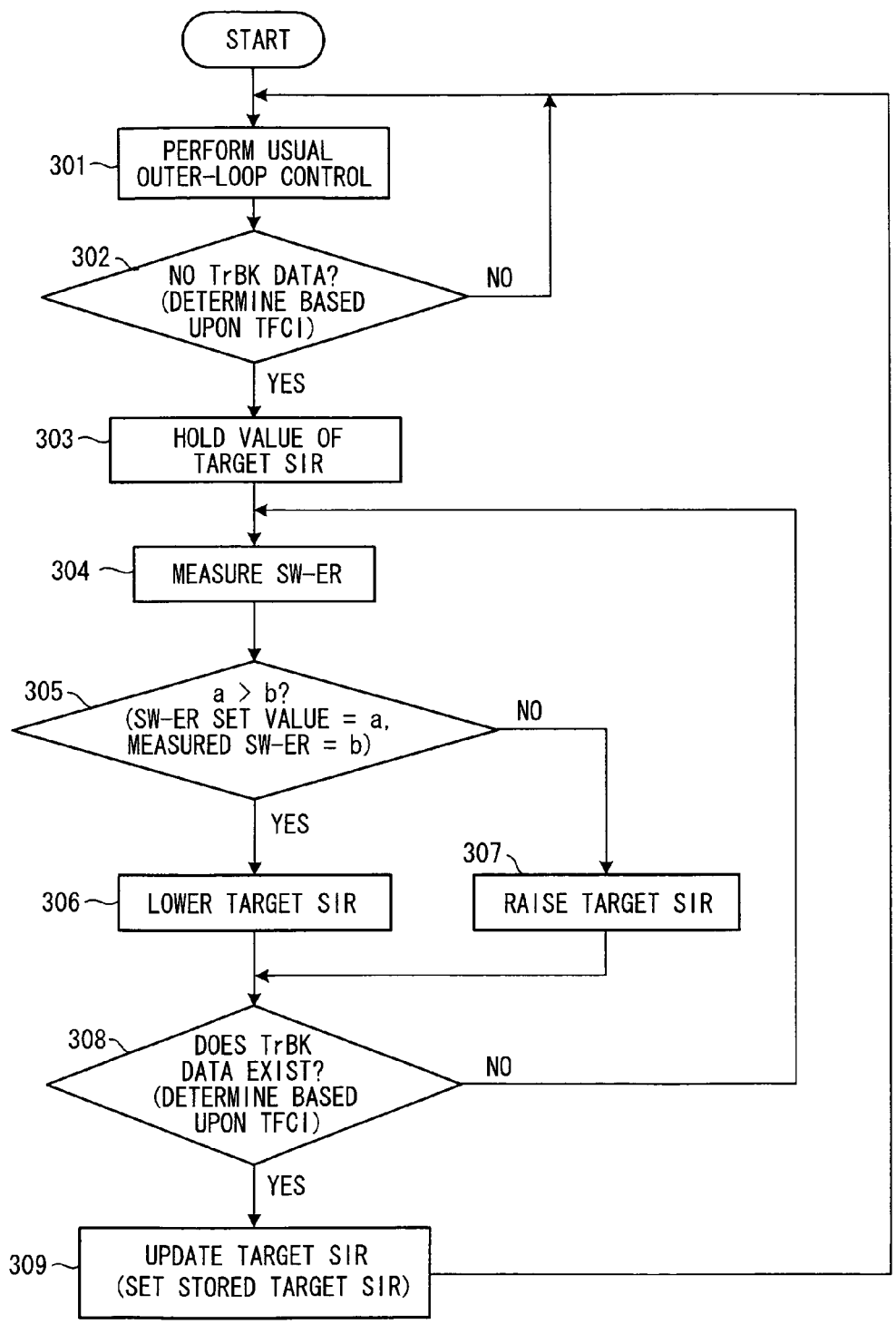
FIG. 4 is a flowchart of outer-loop control processing according to a first embodiment of the present invention.
Figure 5:
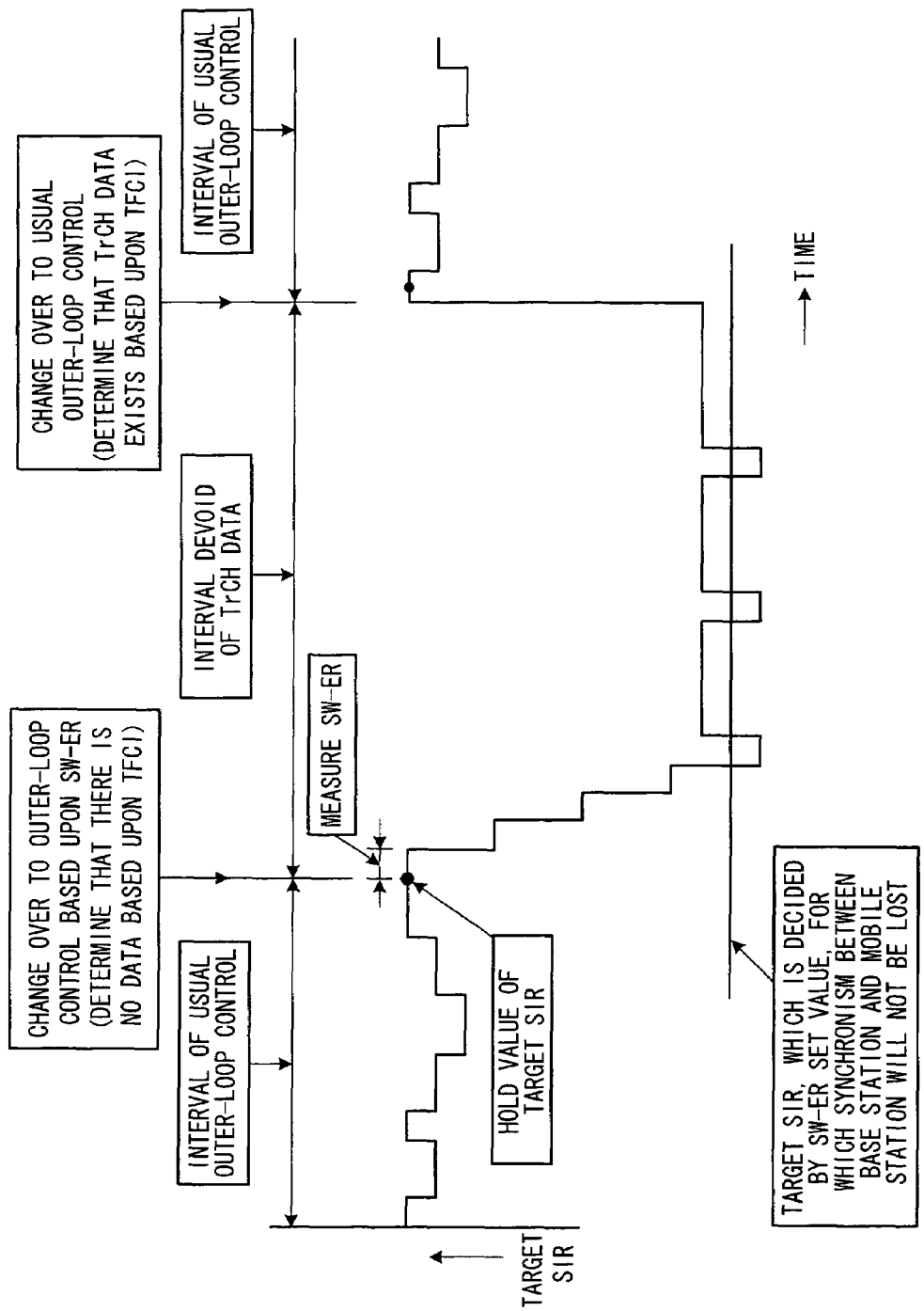
FIG. 5 is a diagram useful in describing outer-loop control according to the first embodiment.

FIG. 1 is a block diagram illustrating a transmission power control apparatus on a receiving side, FIG. 2 is a diagram showing the frame structure of a downlink dedicated physical channel DPCH, FIG. 3 is a diagram useful in describing a synchronous word SW, FIG. 4 is a flowchart of transmission power control according to the present invention, and FIG. 5 is a transition diagram of target SIR that has undergone transmission power control according to the present invention. In the description that follows, a case where a mobile station is controlled will be described. However, similar control can be carried out also in the case of a base station.

Inner-loop control in the transmission power control apparatus of FIG. 1 is the same as that of the prior art. That is, a radio unit 51 receives a radio signal transmitted from a base station, subjects the radio signal to a frequency conversion and orthogonal detection to obtain a baseband signal and inputs the signal to a modem 52. An AD converter (not shown) in the modem 52 converts the baseband signal from an analog signal to a digital signal and inputs the digital signal to a despreader/demodulator 52a. The latter subjects the input signal to despread processing and demodulates the receive data. A SIR measurement unit 52b measures the power ratio between the receive signal and an interference signal and a comparator 52c compares target SIR with measured SIR. A TPC bit generator 52d creates a command that lowers the transmission power by TPC bits if the measured SIR is greater than the target SIR, and creates a command that raises the transmission power by the TPC bits if the measured SIR is less than the target SIR. A spread-spectrum modulator 52e spread-spectrum modulates the transmit data and TPC bits, applies a DA conversion and inputs the analog signal to the radio unit 51. The latter subjects the input signal to processing such as orthogonal modulation, frequency conversion and power amplification and transmits the resultant signal toward the base station from an antenna. The base station applies despread processing to the signal received from the mobile station, demodulates the receive data and TPC bits and controls the transmission power in accordance with a command specified by the TPC bits.

The target SIR is controlled by exercising outer-loop control in parallel with the inner-loop control described above.

According to the present invention, outer-loop control similar to that of the prior art is performed when DPDCH data is present on the dedicated physical channel DPCH. If it is determined that no DPDCH data exists on the channel, outer-loop control in accordance with the error rate of the pilot or error rate of a synchronous word SW contained in the pilot is carried out.

The determination as to whether DPDCH data exists or not is made, based upon TFCI information, by a data existence determination unit 53a in a codec 53. More specifically, the signal demodulated by the modem 52 is input to a decoder 53b, which proceeds to decode the TFCI bits, decode the data on the transport channel TrCH, input the decoded TFCI bits to the data existence determination unit 53a and input the decoded TrCH data to a first outer-loop controller 53c. The data existence determination unit 53a checks to see whether the decoded TFCI bits are all 0's. The data existence determination unit 53a determines that there is no DPDCH data if the TFCI bits are all 0's and determines that there is DPDCH data present if the TFCI bits are not all 0's. It should be noted that at the time of packet communication, it is assumed that absence of TrCH data is decided when the value of TFCI is indicative of all 0's.

If DPDCH data exists, the usual outer-loop control by the first outer-loop controller 53c is carried out. That is, a BLER measurement unit (e.g., a CRC detector) 61 performs CRC error detection for every transport block TrBk and inputs the result of error detection (the measured BLER) of each transport block TrBk to a BLER comparator 62. Since the system specifies target block error rate (BLER) according to transport channel (TrCH), the BLER comparator 62 compares the input measured BLER and the target BLER and inputs the result of the comparison to a target-SIR updating unit 63. The latter increases the target SIR a prescribed amount if the measured BLER is greater than the target BLER, decreases the target SIR a prescribed amount if the measured BLER is less than the target BLER, updates the target SIR so as to satisfy the specified BLER and sets the updated target SIR in the comparator 52c of the inner-loop controller.

By virtue of the outer-loop control described above, the target SIR is updated in such a manner that the target BLER will be satisfied. In addition, transmission power is controlled by inner-loop control in such a manner that the target SIR will be obtained and, overall, BLER becomes equal to the target BLER.

If DPDCH data does not exist, on the other hand, then outer-loop control is performed by a second outer-loop controller 52f in accordance with the error rate of the pilot or error rate of a synchronous word SW contained in the pilot. Outer-loop control in accordance with the error rate of a synchronous word SW will now be described.

The synchronous word SW is composed of some of the bits that constitute the pilot and is used to determine whether a base station and mobile station are being kept in sync. It is employed in order to halt transmission from a mobile station. That is, if a synchronous word SW cannot be detected correctly in excess of 40% in 160 ms, for example, then transmission from the mobile station is halted on the grounds that the base station and mobile station are out of sync.

The downlink dedicated physical channel DPCH has the structure shown in FIG. 2. One frame has a duration of 10 ms and is composed of 15 slots (slot #0 to slot #14). The dedicated physical control channel DPCCH and dedicated physical data channel DPDCH are multiplexed into each slot, and control data such as TPC information, TFCI information and pilot is transmitted. The data length and control information length can be changed in dependence upon the transmission speed, pilot length $N_{pilot}$ can be 2, 4, 8 and 16 bits, as shown in FIG. 3, and the pilot patterns of each of the slots #0 to #14 are as illustrated. ① In a case where $N_{pilot}$=2 holds, all bits of the pilot become the synchronous word SW. ② In a case where $N_{pilot}=4$ holds, the two bits in the first half of the pilot (the symbol in the first half) become the synchronous word SW or all bits of the pilot become the synchronous word SW. ③ In a case where $N_{pilot}=8$ holds, symbol numbers 1, 3 of the pilot become the synchronous word SW. ④ In a case where $N_{pilot}=16$ holds, symbol numbers 1, 3, 5, 7 of the pilot become the synchronous word SW.

If there is no DPDCH data, an SW-ER measurement unit 71 in the second outer-loop controller 52*f* extracts the synchronous word SW from the demodulated data, compares the extracted synchronous word SW and the known synchronous word pattern (FIG. 3) and, if the two differ, counts this as a synchronous-word SW error, thereby measuring synchronous-word error rate SW-ER. An SW-ER comparator 72 compares the measured synchronous-word error rate SW-ER and the target error rate set in advance. A target-SIR updating unit 73 increases the target SIR a prescribed amount if the measured SW-ER is greater than the target SW-ER, decreases the target SIR a prescribed amount if the measured SW-ER is less than the target SW-ER, and sets this target SIR in the comparator 52*c* of the inner-loop controller. By virtue of the outer-loop control described above, the target SIR is updated in such a manner that the target SW-ER will be satisfied. In addition, transmission power is controlled by inner-loop control in such a manner that the agreement with target SIR will be obtained and, overall, the measured SW-ER becomes equal to the target BLER.

Accordingly, if it can be so arranged that the transmitting and receiving sides will not become desynchronized when transmission power control is carried out so as to achieve equality with the target SIR set in the comparator 52*c* of the inner-loop control at such time that the relation (measured SW-ER)=(target SW-ER) is achieved, then the desirable result that will be attained is that synchronization can be maintained with little power. The present invention therefore sets the minimum target SW-ER in such a manner that the transmitting and receiving sides will not become desynchronized.

FIG. 4 is a flowchart of outer-loop control processing according to the first embodiment, and FIG. 5 is a diagram useful in describing outer-loop control according to the first embodiment.

When DPDCH data exists on the dedicated physical channel DPCH (see FIG. 2), the usual first outer-loop control is performed (step 301). When it is determined based upon TFCI that there is no DPDCH data (TrBk data) (step 302), the value of the target SIR based upon first inner-loop control at this time is stored (step 303). Next, control is switched over to second outer-loop control based upon SW-ER and the synchronous-word error rate SW-ER prevailing after the changeover is measured (step 304). The synchronous-word error rate SW-ER is measured constantly during the time that second outer-loop control based upon SW-ER is being performed.

Next, an SW-ER set value (target SW-ER=a) that will not allow the base station and mobile station to become desynchronized and the SW-ER (=b) that was measured at step 304 are compared (step 305), the target SIR is lowered a prescribed amount (step 306) if the target SW-ER is greater than the measured SW-ER (i.e., if a>b holds), and the target SIR is raised a prescribed amount (step 307) if target SW-ER is less than the measured SW-ER (i.e., if a<b holds).

It is thenceforth investigated based upon TFCI whether DPDCH data (TrBk data) exists (step 308). If this data does not exist, the processing from step 304 onward is repeated. As a result, the target SIR diminishes and declines until the relation (measured SW-ER)=(target SW-ER) is attained, as shown in FIG. 5. If the relation (measured SW-ER)=(target SW-ER) is attained, then control is performed based upon the magnitudes of the target SW-ER and measured SW-ER centering on the smallest target SIR (=SIRmin) necessary to maintain synchronism between the transmitting and receiving sides. It should be noted that the target SW-ER is set in such a manner that the transmitting and receiving sides will not become desynchronized from each other. By virtue of the above operation, power in an interval that is devoid of data can be made much less than that in the prior art.

If presence of DPDCH data is detected at step 308 based upon TFCI, then the target SIR must be restored to the state that prevailed prior to second outer-loop control. Since the value of the target SIR at such time was stored at step 303, this stored target SIR is set in the comparator 52*c* of the inner-loop controller (step 309), control returns to step 301 and the usual first outer-loop control starts.

Modification

When control is restored to the first outer-loop control from the second outer-loop control in the above embodiment, the target SIR stored at step 303 is set in the comparator 52*c* of the inner-loop controller. However, it can also be so arranged that the restoration is made upon setting a value obtained by adding a difference $\Delta$SIR between the retained target SIR and the minimum target SIR (=SIRmin) to the present target SIR in the comparator 52*c* of the inner-loop controller.

Figure 6:
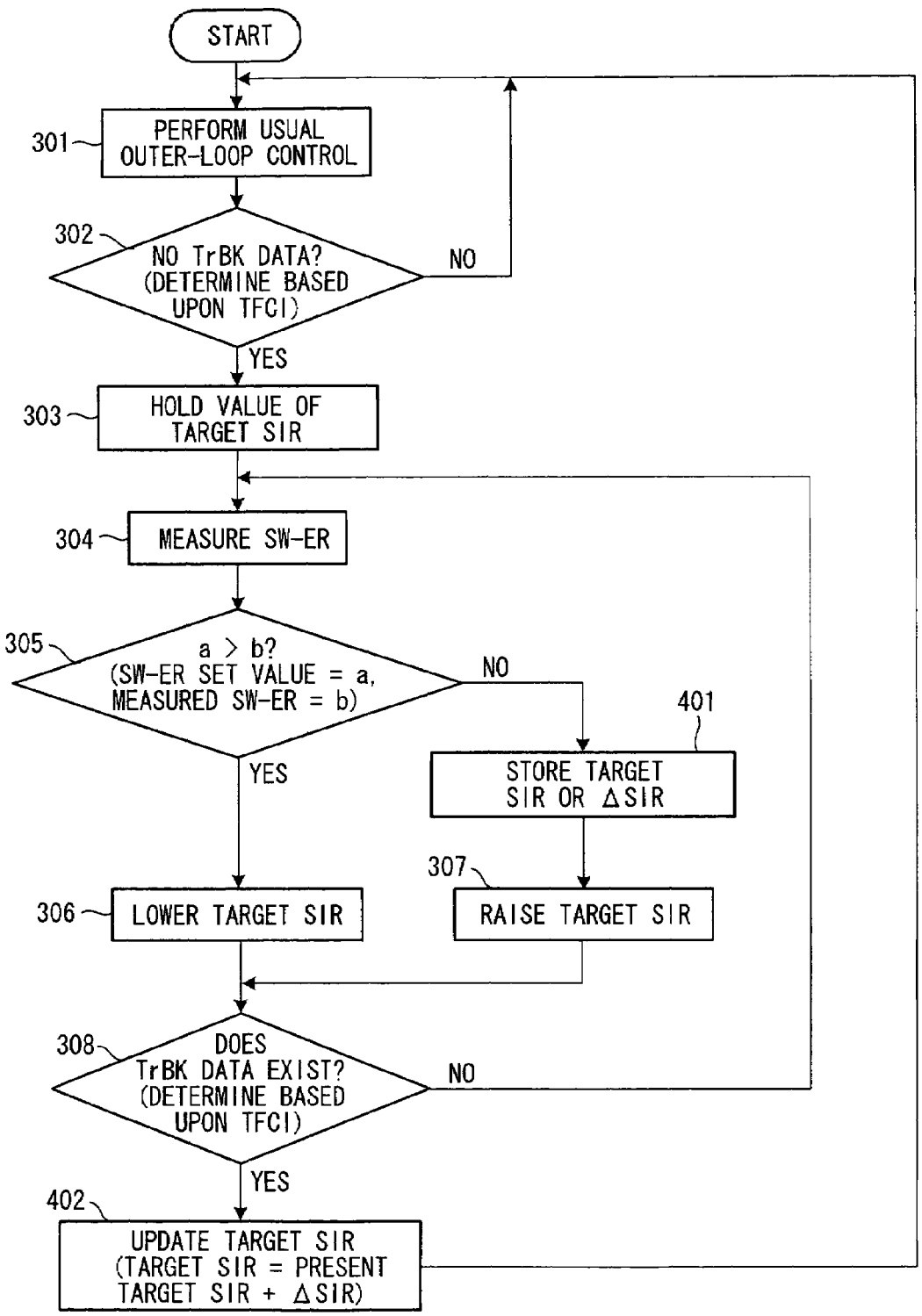
FIG. 6 is a flowchart of processing according to a modification.
Figure 7:
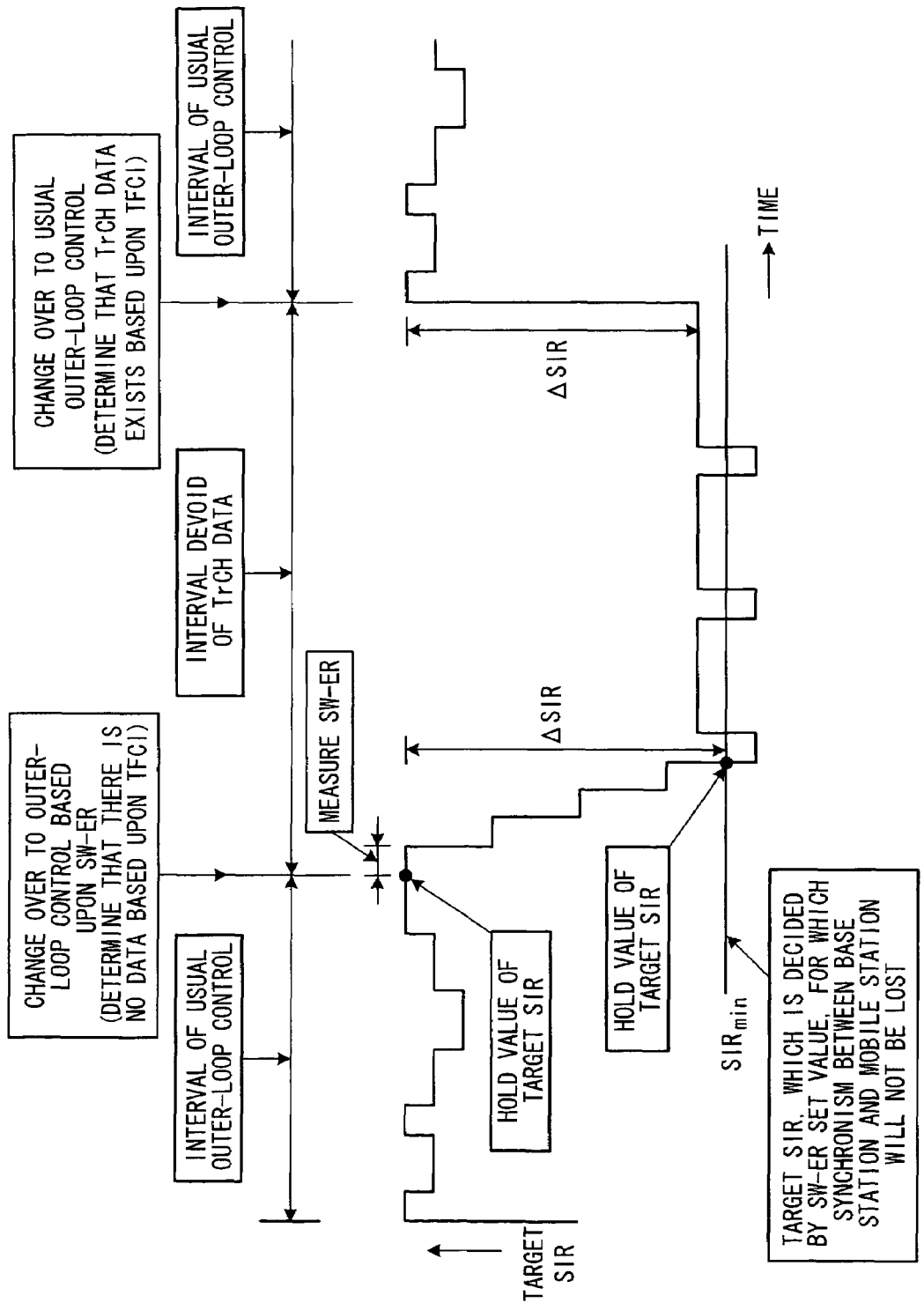
FIG. 7 is a diagram useful in describing outer-loop control according to a modification.

FIG. 6 is a flowchart of processing according to this modification, and FIG. 7 is a diagram useful in describing outer-loop control according to this modification. The flowchart of FIG. 6 differs from that of FIG. 4 in that a step 401 is added and a step 402 is substituted for step 309.

If it is found at step 305 that the relation (target SW-ER)<(measured SW-ER) (i.e., a<b) has been attained for the first time, then ① the target SIR (=SIRmin) prevailing at this time or ② the difference $\Delta$SIR between the target SIR (=SIRmin) and the target SIR stored at step 303 is stored (step 401), and then the target SIR is raised a prescribed amount (step 307). It should be noted that the processing of step 401 is executed only when the relation (target SW-ER)<(measured SW-ER) (i.e., a<b) has been attained for the first time; this step is skipped thereafter.

Further, if the presence of DPDCH data is detected based upon TFCI at step 308, then the processing described below is executed in the case where ① the target SIR was stored and ② the case where the difference $\Delta$SIR was stored at step 401.

In the case where the target SIR (=SIRmin) was stored at step 401, the difference $\Delta$SIR between this target SIR and the target SIR stored at step 303 is obtained, a value that is the result of adding this difference to the present target SIR is adopted at the target SIR and this target SIR is set in the comparator 52*c* in the inner-loop controller (step 402). Control then returns to step 301 and the usual first outer-loop control commences.

In the case where the difference $\Delta$SIR was stored at step 401, on the other hand, a value that is the result of adding this difference to the present target SIR is adopted at the target SIR and this target SIR is set in the comparator 52*c* in the inner-loop controller (step 402). Control then returns to step 301 and the usual first outer-loop control commences.

The modification above is such that even if the target SIR for maintaining synchronism is far removed from the initial value (=SIRmin) during second outer-loop control owing to a change in environment, the target SIR is set back by the amount of the difference $\Delta$SIR, thereby making it possible to approach the target BLER in a short period of time following the changeover to the usual first outer-loop control.

(B) Second Embodiment

In the first embodiment, whether or not DPDCH data (TrCH data) exists is determined based upon the result of decoding the TFCI in the codec. Though the data after decoding by the codec has a high precision, control slows down somewhat because decoding processing is executed. By using the TFCI data after demodulation by the modem, therefore, precision declines somewhat but control can be performed at high speed.

Figure 8:
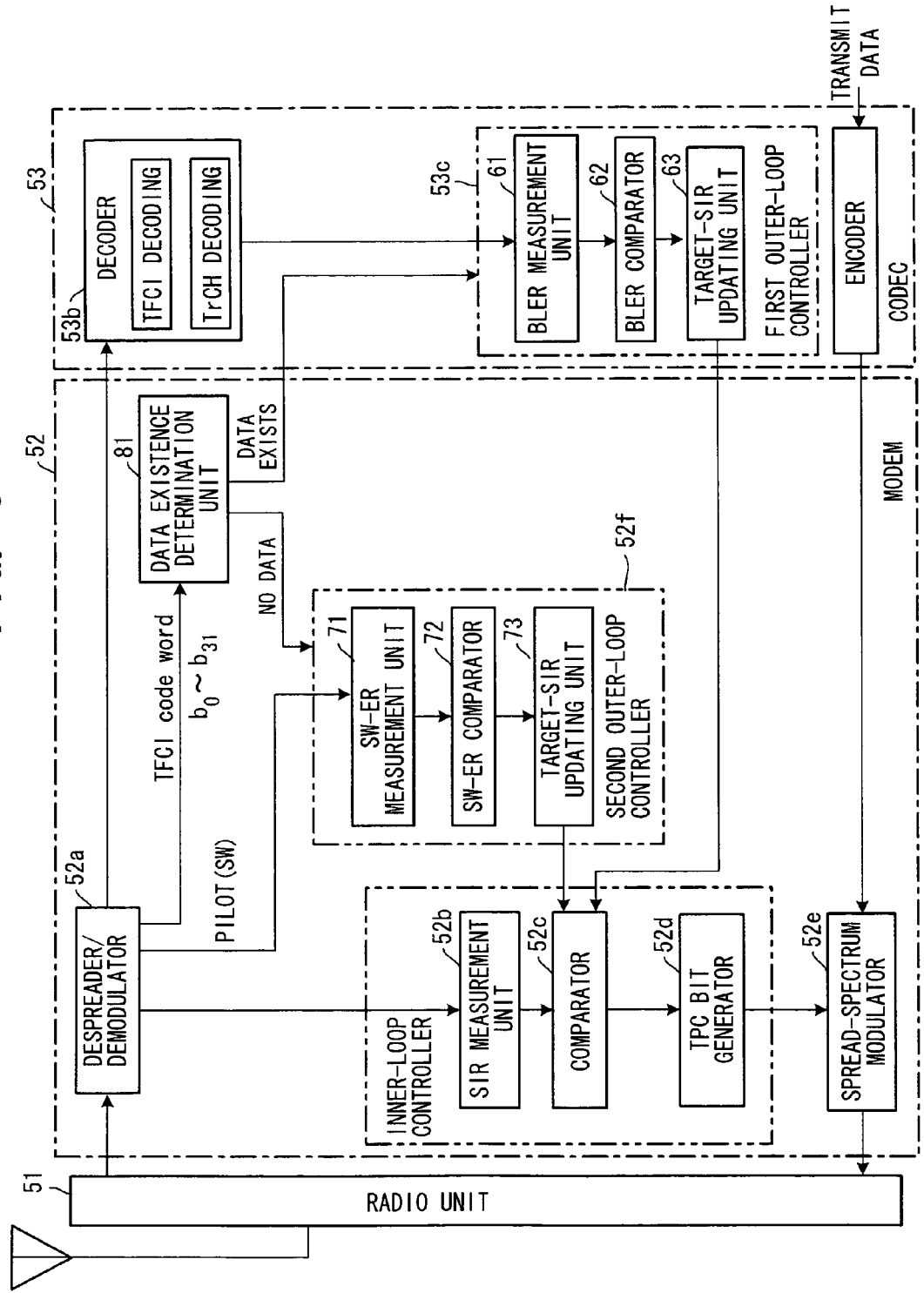
FIG. 8 is a block diagram of a second embodiment in which a determination as to whether data exists or not is made using TFCI information after demodulation by a modem.
Figure 9:
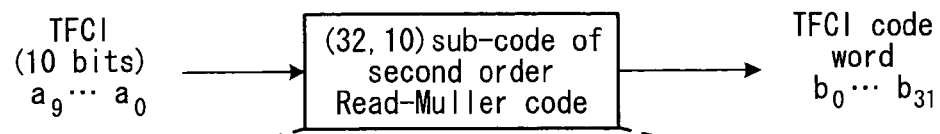
FIG. 9 is a diagram useful in describing processing for TFCI encoding.
Figure 10:
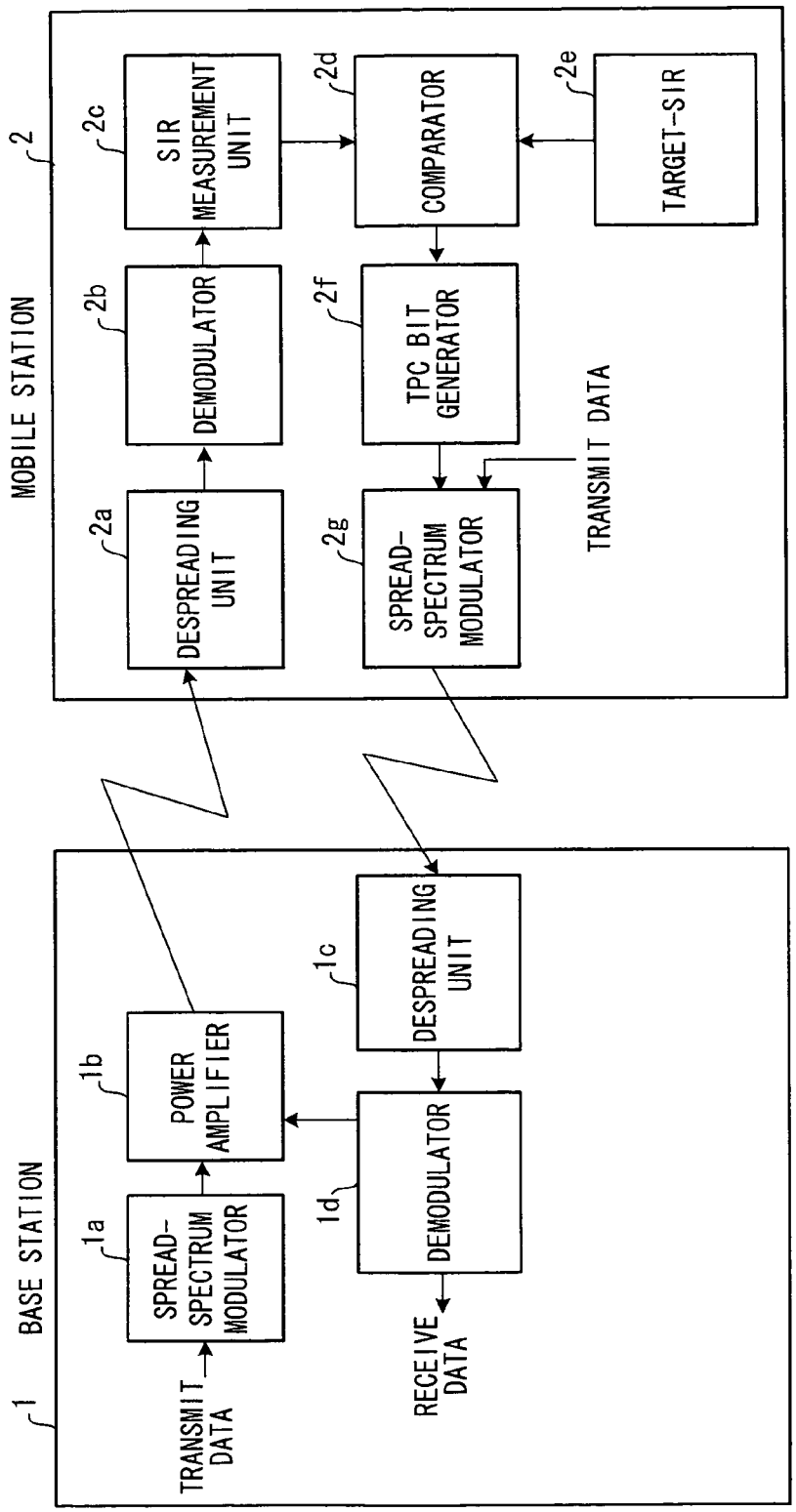
FIG. 10 is a system block diagram for describing inner-loop transmission power control according to the prior art.
Figure 11:
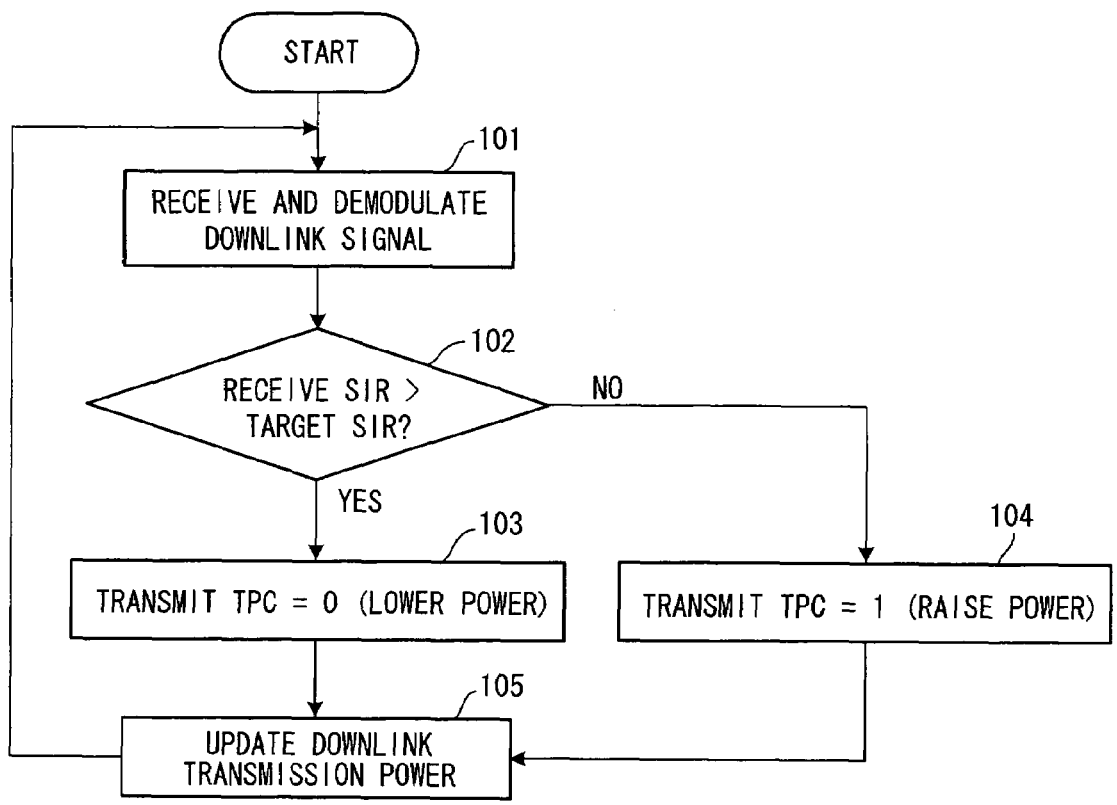
FIG. 11 is a flowchart of processing in inner-loop transmission power control according to the prior art.
Figure 12:
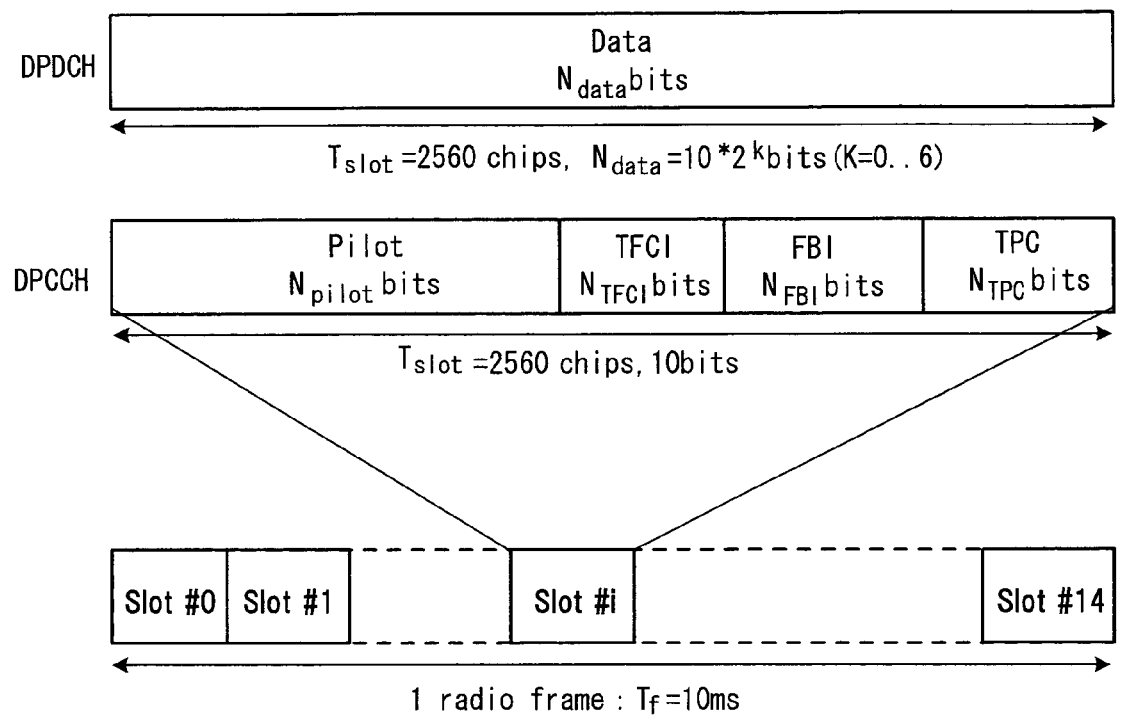
FIG. 12 is a diagram showing the frame structure of an uplink DPCH according to the prior art.
Figure 13:
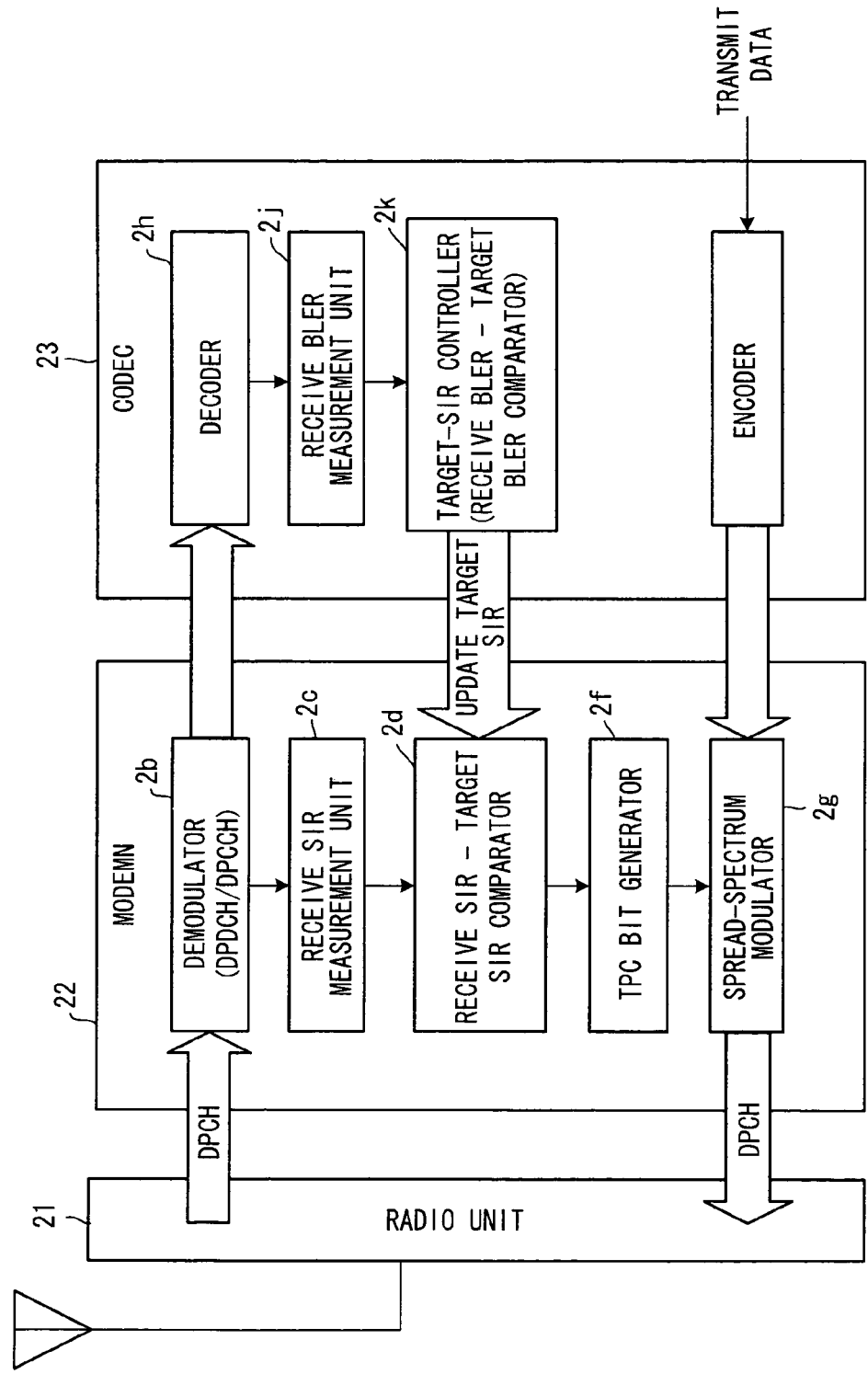
FIG. 13 is a block diagram illustrating a transmission power control apparatus on a receiving side, the apparatus including an outer-loop control section according to the prior art.
Figure 14:
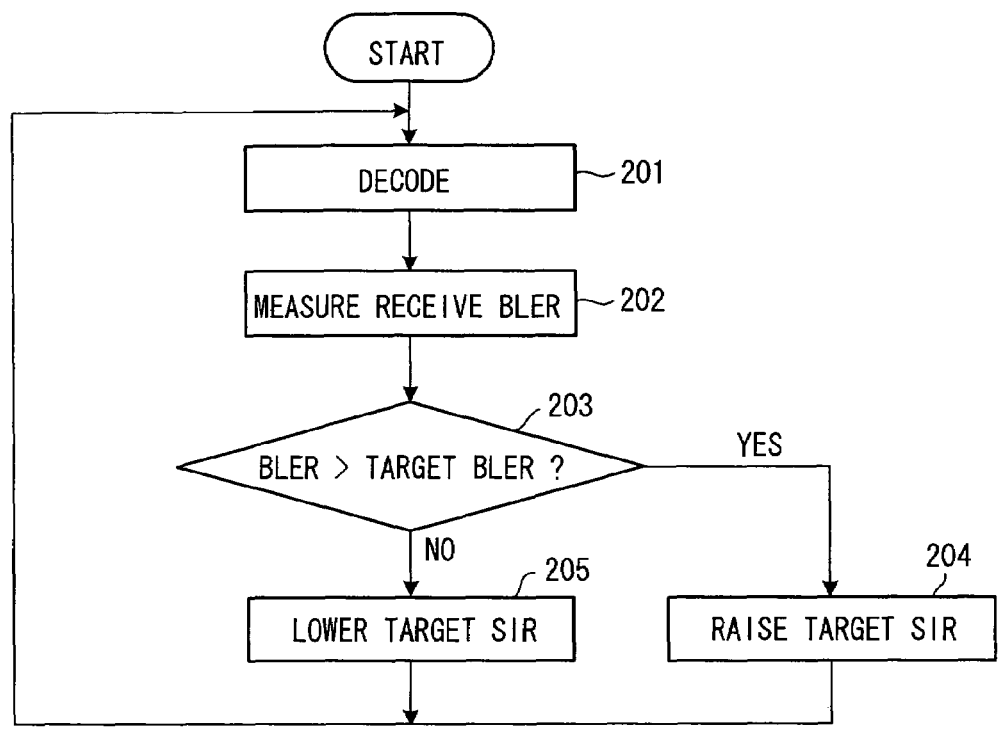
FIG. 14 is a processing flowchart of outer-loop control according to the prior art.
Figure 15:
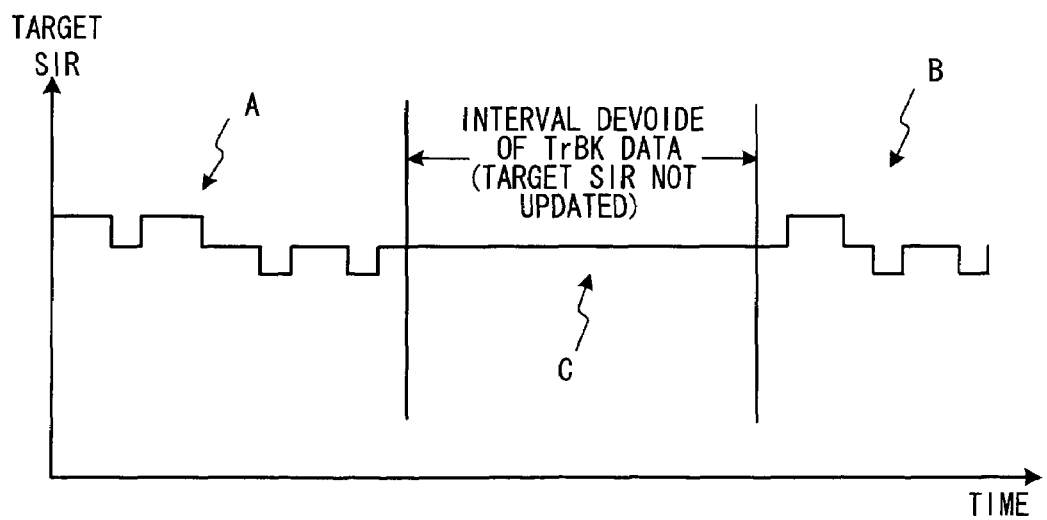
FIG. 15 is a diagram useful in describing target SIR that has undergone outer-loop control according to the prior art.

FIG. 8 is a block diagram of a second embodiment in which a determination as to whether data exists or not is made using TFCI information after demodulation by the modem. Components identical with those of the first embodiment in FIG. 1 are designated by like reference characters. The second embodiment differs in that a data existence determination unit 81 is provided in the modem 52 and determines whether data exists or not using the TFCI information after demodulation by the modem.

The TFCI of ten bits is transmitted upon being encoded to a TFCI code word of 32 bits in accordance with the following equation:

$$b_i = \sum_{n=0}^{9} (a_n \times M_{i,n}) \bmod 2$$

In accordance with the above equation, if the ten bits of the TFCI (bits a9 to a0) are all 0's, then the 32 bits of the TFCI code word (b0 to b 32) also are all 0's. Accordingly, the data existence, determination unit 81 is capable of identifying whether or not DPDCH data is present based upon whether or not the demodulated TFCI code word (b0 to b32) is all 0's.

If the data existence determination unit 81 detects the presence of DPDCH data in FIG. 8, first outer-loop control by the first outer-loop controller 53c is performed in a manner similar to that of the first embodiment. If the data existence determination unit 81 detects the absence of DPDCH data, on the other hand, second outer-loop control by the second outer-loop controller 52f using the SW-ER is carried out in a manner similar to that of the first embodiment.

(C) Modification

Second outer-loop control is performed above using the error rate of the synchronous word SW. However, second outer-loop control can be performed using the error rate of the pilot.

Second outer-loop control is performed above based upon the target error rate of the pilot. However, upper and lower limits of the target error rate of the pilot can be provided and control can be performed in such a manner that the measured error rate of the pilot will fall within the range defined by the upper and lower limits.

Thus, by practicing the present invention, as described above, when communication is carried out solely on the DPCCH, power can be reduced significantly over the prior art and communication can be carried out with enough power needed to maintain communication. As a result, the adverse effects of noise upon mobile terminals communicating in the vicinity and upon the base station of these terminals can be reduced and it is possible to reduce wireless-device traffic that is to undergo transmission power control. The practical end result is that transmission power control is carried out efficiently.

As many apparently widely different embodiments of the present invention can be made without departing from the spirit and scope thereof, it is to be understood that the invention is not limited to the specific embodiments thereof except as defined in the appended claims.

What is claimed is:

1. A transmission power control method that compares error rate of receive data and target error rate on a receiving side, controls target SIR by a result of the comparison, and causes a transmitting side to control transmission power in such a manner that measured SIR will agree with the target SIR for each slot that constitutes a frame of a dedicated physical channel, comprising the steps of:
    determining whether a slot is a slot in which data is being transmitted by a data channel;
    comparing the error rate of receive data after decoding and the target error rate of the data and controlling the target SIR by a result of the comparing in the slot in which data is being transmitted by the data channel;
    measuring the error rate of a demodulated receive pilot in a slot in which data is not being transmitted and a pilot is being transmitted by a control channel; and
    controlling the target SIR upon comparing the measured error rate of the pilot and target error rate of the pilot in the slot in which data is not being transmitted and a pilot is being transmitted by the control channel.

2. The method according to claim 1, wherein the error rate of a synchronous word contained in a pilot is adopted as the error rate of the pilot.

3. The method according to claim 1, further comprising a step of determining whether a slot is a slot in which data is being transmitted based upon results obtained by decoding demodulated TFCI information.

4. The method according to claim 1, further comprising a step of determining whether a slot is a slot in which data is being transmitted based upon TFCI information that has been demodulated by a modem.

5. The method according to claim 1, further comprising a step of setting the target error rate of the pilot in such a manner that the transmitting and receiving sides will not become desynchronized when the target SIR has been lowered upon comparing the measured error rate of the pilot and the target error rate of the pilot.

6. The method according to claim 5, further comprising a step of providing upper and lower limits of the target error rate of the pilot and controlling the target SIR in such a manner that the measured error rate of the pilot will fall within a range defined by said upper and lower limits.

7. The method according to claim 1, further comprising a step of storing target SIR in control before a changeover is made from the control in the slot in which data is being transmitted to the control in the slot in which data is not being transmitted.

8. The method according to claim 7, further comprising a step of storing target SIR prevailing when the measured error rate of the pilot has attained the target error rate, after the changeover is made to the control in the slot in which data is not being transmitted.

9. The method according to claim 8, wherein when the change is made from the control in the slot in which data is not being transmitted to the control in the slot in which data is being transmitted, a value obtained by adding the absolute value of the difference between the two stored target SIRs or the absolute value of the stored difference to the target SIR that prevailed prior to the changeover of control is set as the target SIR.

10. The method according to claim 7, further comprising a step of storing the difference between target SIR prevailing when the measured error rate of the pilot has attained the target error rate and the stored target SIR, after the changeover is made to the control in the slot in which data is not being transmitted.

11. The method according to claim 7, further comprising a step of setting the stored SIR as target SIR when a changeover is made from the control in the slot in which data is not being transmitted to the control in the slot in which data is being transmitted.

12. A transmission power control apparatus that compares error rate of receive data and target error rate on a receiving side, controls target SIR by a result of the comparison, and causes a transmitting side to control transmission power in such a manner that measured SIR will agree with the target SIR for each slot that constitutes a frame of a dedicated physical channel, comprising:
 a modem for demodulating a receive signal;
 a data existence determination unit for determining whether a slot is a slot in which data is being transmitted by a data channel;
 a decoder for decoding the receive data;
 a first target-SIR controller for comparing the error rate of receive data after decoding and the target error rate of the data and controlling the target SIR by the result of the comparison in the slot in which data is being transmitted by the data channel; and
 a second target-SIR controller for measuring the error rate of a receive pilot in a slot, which has been demodulated by said modem, comparing the measured error rate of the pilot and target error rate of the pilot and controlling the target SIR by the result of the comparison in the slot in which data is not being transmitted and a pilot is being transmitted by a control channel.

13. The apparatus according to claim 12, wherein said second target-SIR controller adopts the error rate of a synchronous word contained in a pilot as the error rate of the pilot.

14. The apparatus according to claim 12, wherein said data existence determination unit determines whether a slot is a slot in which data is being transmitted based upon results obtained by decoding demodulated TFCI information.

15. The apparatus according to claim 12, wherein said data existence determination unit determines whether a slot is a slot in which data is being transmitted based upon TFCI information that has been demodulated by said modem.

16. The apparatus according to claim 13, wherein said second target-SIR controller sets the target error rate of the pilot in such a manner that the transmitting and receiving sides will not become desynchronized when said second target-SIR controller has lowered the target SIR upon comparing the measured error rate of the pilot and target error rate of the pilot.

17. The apparatus according to claim 13, wherein said second target-SIR controller provides upper and lower limits of the target error rate of the pilot and controls the target SIR in such a manner that the measured error rate of the pilot will fall within a range defined by said upper and lower limits.

18. The apparatus according to claim 12, further comprising storage means for storing target SIR that prevails before a changeover is made from the control in the interval slot in which data is being transmitted to the control in the interval slot in which data is not being transmitted.

19. The apparatus according to claim 18, wherein the difference between target SIR prevailing when the measured error rate of the pilot has attained the target error rate and the stored target SIR is stored after the changeover is made to the control in the slot in which data is not being transmitted.

20. The apparatus according to claim 18, wherein said second target-SIR controller sets the stored SIR as target SIR when a changeover is made from the control in the slot in which data is not being transmitted to the control in the slot in which data is being transmitted.

21. The apparatus according to claim 12, further comprising storage means for storing target SIR prevailing when the measured error rate of the pilot has attained the target error rate, after the changeover is made to the control in the slot in which data is not being transmitted.

22. The apparatus according to claim 21, wherein when the change is made from the control in the slot in which data is not being transmitted to the control in the slot in which data is being transmitted, said second target-SIR controller sets, as the target SIR, a value obtained by adding the absolute value of the difference between the two stored target SIRs or the absolute value of the stored difference to the target SIR that prevailed prior to the changeover of control.

* * * * *